March 11, 1952     W. HARGREAVES     2,588,719
LAMINATED ELECTRICAL ASSEMBLY
AND METHOD OF MAKING THE SAME
Filed March 26, 1947
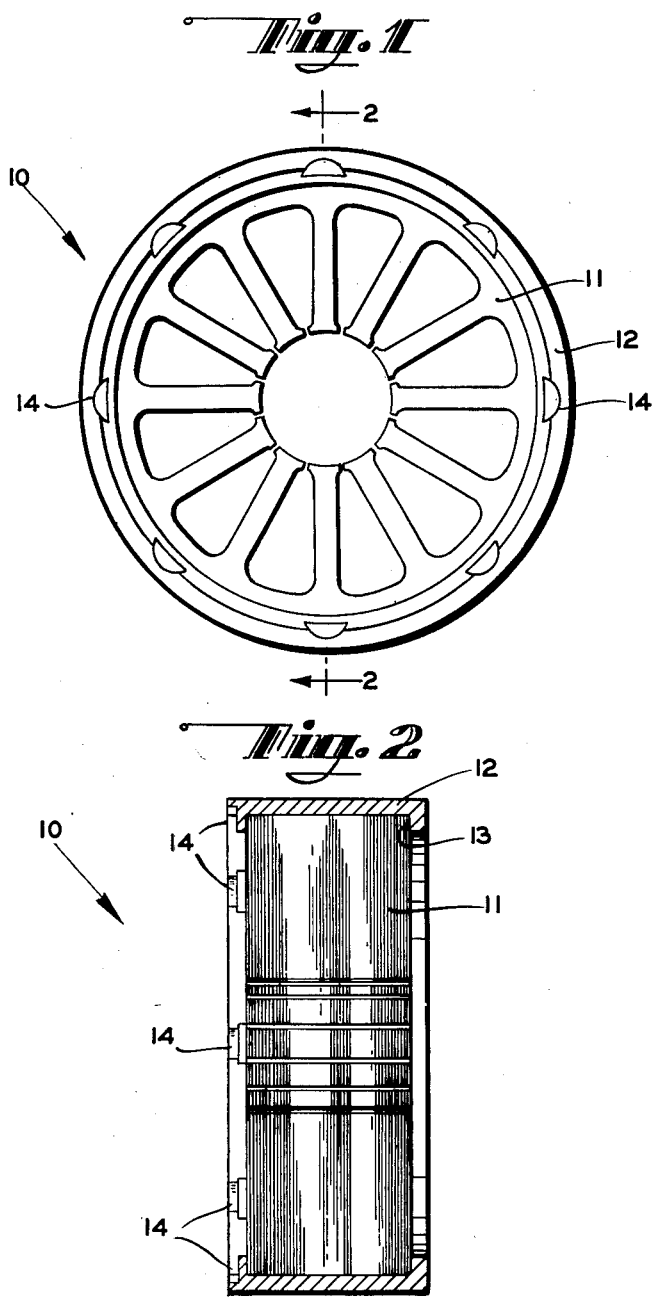
INVENTOR
WILLIAM HARGREAVES
BY
ATTORNEY Patented Mar. 11, 1952

2,588,719

UNITED STATES PATENT OFFICE 2,588,719

LAMINATED ELECTRICAL ASSEMBLY AND METHOD OF MAKING THE SAME

William Hargreaves, Bergenfield, N. J., assignor to Bendix Aviation Corporation, Teterboro, N. J., a corporation of Delaware Application March 26, 1947, Serial No. 737,259

1 Claim. (Cl. 171—252)

This invention relates to electrical apparatus, and more particularly to the construction of laminated electrical apparatus.

In the manufacture of stator or core assemblies for electrical apparatus, present day methods entail rather complicated assembly methods requiring skilled technicians. These methods in fabricating the laminated assemblies require the arduous stacking and cementing of the laminations to form the assemblies, or spinning a thin shell over lamination assemblies, or, as in the case of larger core assemblies, the stacking of the premachine laminations for the purpose of bolting the same together. In the case of skewed assemblies, the laminations are stacked and held in place while drilling and reaming operations are performed prior to the bolting of the laminations together.

An object of my present invention is to provide a simplified and inexpensive method for the fabrication of laminated assemblies which lends itself readily to mass production with semi-skilled labor.

Another object of my invention is to provide a novel laminated assembly for electrical apparatus in which the laminations are retained in a frame or sleeve by a series of dimples and/or shoulders struck into the frame.

Other desirable features and advantages of this invention will be apparent in the description hereinafter made in connection with the accompanying drawings, in which one of the various possible illustrative embodiments of my invention is shown, and of which Fig. 1 is a plan view of a stator assembly, while Fig. 2 is a cross-sectional view taken along the line 2—2 of Fig. 1.

Referring to the drawings, 10 designates a stator assembly for a small motor. The assembly 10 comprises a plurality of stacked stator laminations 11 within a frame or sleeve 12. A shoulder 13 provided on sleeve 12 is abutted by the end lamination within said sleeve. The stator laminations are pressed together and held against the shoulder 13 by a series of dimples 14 struck into sleeve 12. The shoulder 13 provided on sleeve 12 may be replaced by a series of dimples struck into the sleeve similar to the dimples 14 provided at the other end of the stack.

In the fabrication of the laminated assembly illustrated above, the laminations 11 are mounted on a tight fitting arbor, the laminations being tightly pressed together. The assembly is then placed within the frame or sleeve 12 and the dimples 14 are swaged or peened into the sleeve by means of a staking tool. The arbor is then withdrawn and the laminated assembly is ready for final machining and wiring.

There is thus provided a simple method and assembly in which the objects of this invention are achieved and which is well adapted to meet the conditions of practical use.

As various embodiments may be made of the above invention, it is to be understood that the matter herein set forth, or shown in the accompanying drawings is to be interpreted as illustrative and not in a limiting sense.

Having thus described my invention, I claim as new and desire to secure by Letters Patent:

A laminated electrical assembly comprising an annular frame having an intermediate wall and an inwardly extending retaining rib formed integrally with one end of the wall, and a laminated stack within said frame with the end lamination of the stack engaging said rib, the opposite end of the wall being dimpled inwardly at a plurality of points toward the stack to engage directly the first lamination of the stack and to press said stack in an axial direction against said rib to thereby retain said stack within said frame and to retain said laminations closely assembled to one another, the inwardly dimpled points of the wall constituting a second retaining means for said laminated stack.

WILLIAM HARGREAVES.

REFERENCES CITED

The following references are of record in the file of this patent:

UNITED STATES PATENTS

| Number | Name | Date |
|---|---|---|
| 1,361,136 | Burke | Dec. 7, 1920 |
| 1,677,936 | Thordarson | July 24, 1928 |
| 2,033,633 | Hawksley | Mar. 10, 1936 |
| 2,269,154 | Hemphill | Jan. 6, 1942 |
| 2,411,684 | Hamilton | Nov. 26, 1946 |
| 2,419,469 | Spiro | Apr. 22, 1947 |
| 2,423,345 | Roters | July 1, 1947 |

FOREIGN PATENTS

| Number | Country | Date |
|---|---|---|
| 334,238 | Great Britain | Sept. 1, 1930 |
| 582,891 | France | Oct. 22, 1924 |